United States Patent [19]

Gregory et al.

[11] 4,146,800
[45] Mar. 27, 1979

[54] APPARATUS AND METHOD OF GENERATING ELECTRICITY FROM WIND ENERGY

[76] Inventors: Stephen E. Gregory, 1605 N. State St.; Alma K. Schurig, 231 E. 700 N., both of Orem, Utah 84057

[21] Appl. No.: 620,597

[22] Filed: Oct. 8, 1975

[51] Int. Cl.$^2$ .......................... H02P 9/04; H02N 1/00
[52] U.S. Cl. ................................. 290/44; 322/2 A; 310/10; 290/55;1
[58] Field of Search .................. 290/44, 55, 1; 310/5, 310/6, 10; 179/111; 60/202; 322/2, 2 A

[56] References Cited

U.S. PATENT DOCUMENTS

| 414,943 | 11/1889 | Dewey | 310/5 |
|---|---|---|---|
| 1,014,719 | 1/1912 | Pennock | 310/5 |
| 2,004,352 | 6/1935 | Simon | 310/5 |
| 2,331,206 | 10/1943 | Lindenblad | 310/5 |
| 2,643,349 | 6/1953 | Smith | 310/5 |
| 2,958,790 | 11/1960 | Bahnson | 310/5 |
| 3,130,945 | 4/1964 | DeSeversky | 310/5 |
| 3,136,867 | 6/1964 | Brettell | 179/111 |
| 3,191,077 | 6/1965 | Marks et al. | 310/308 |
| 3,411,025 | 11/1968 | Marks | 310/11 |
| 3,518,461 | 6/1970 | Marks | 310/10 |
| 3,792,293 | 2/1974 | Marks | 310/5 |
| 3,894,198 | 7/1975 | Murayama et al. | 179/111 |

OTHER PUBLICATIONS

Letter "Re: Charged Aerosol Technology and its Applications" of Dec. 30, 1971 fm Alun M. Marks to Wm Magruder.

*Primary Examiner*—Robert K. Schaffer
*Assistant Examiner*—John W. Redman
*Attorney, Agent, or Firm*—George H. Mortimer

[57] ABSTRACT

The invention relates to apparatus for and method of generating electricity from wind energy.

The apparatus comprises means such as a foraminous condenser plate and a condenser surface, e.g., the earth, for producing an electrostatic field in the open through which wind can blow, means such as needle points and balls or fine wires and cylinders capable of creating a corona discharge or equivalent ion or electron generator for producing charged particles to be entrained in and carried by the wind against the direction of movement imposed on the particles by the field, which results in an increase in the electric potential across the field, means such as a second foraminous plate or the earth for collecting the charged particles and means such as a high voltage power regulator and converter for making the increased potential available for utilization.

The method comprises operations corresponding to the means, viz., producing an electrostatic field in the open through which wind can blow, generating charged particles to be entrained in and carried by the wind against the direction of movement imposed on the particles by the field, resulting in an increase of the charged particles and making the increased potential available for utilization.

4 Claims, 10 Drawing Figures

FIG. 1
FIG. 2
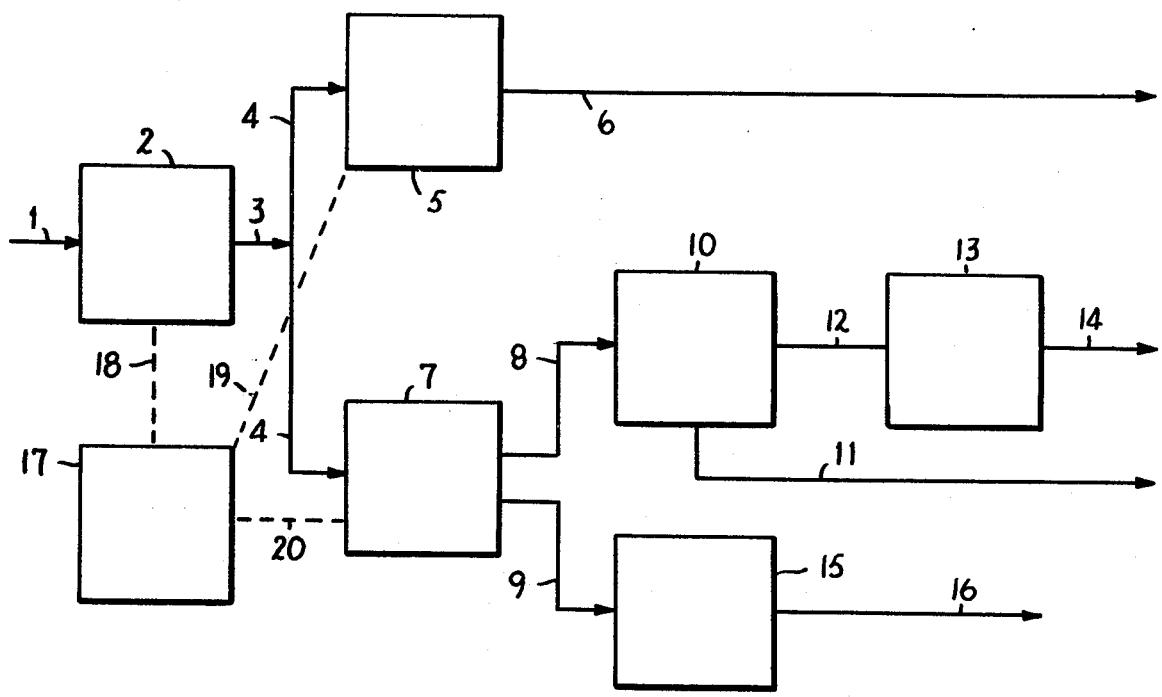
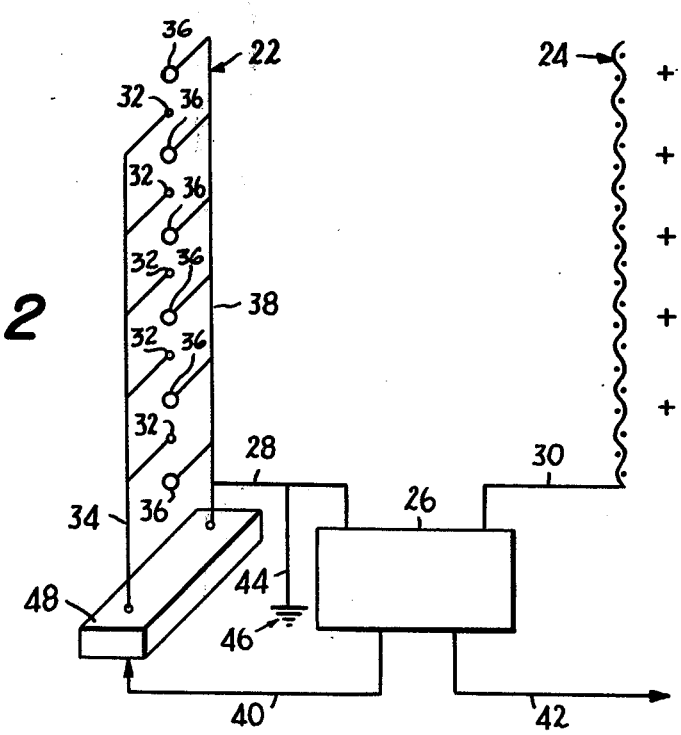

APPARATUS AND METHOD OF GENERATING ELECTRICITY FROM WIND ENERGY

INTRODUCTION

The invention relates to apparatus for and method of generating electricity from wind energy. The apparatus comprises means for producing an electrostatic field in the open through which wind can blow, means for generating charged particles to be entrained in and carried by the wind against the direction of movement imposed on the particles by the field, which results in an increase in the electric potential across the field, means for collecting the charged particles and means for making the increased potential available for utilization. The method comprises operations corresponding to the means, viz., producing an electrostatic field in the open through which wind can blow, generating charged particles to be entrained in and carried by the wind against the direction of movement imposed on the particles by the field, resulting in an increase of the electric potential across the field, collecting the charged particles and making the increased potential available for utilization.

BACKGROUND OF THE INVENTION

The law of nature is known that moving a charged particle through an electrostatic field in a direction opposite to the direction of movement imposed on the particle by the field requires work, or the expenditure of energy, which is manifested by an increase in potential across the field. Utilization of this law of nature has been proposed in machines having a fan for blowing the stream of air or other gas through a conduit having an ionizing or injector section, a conversion section and collector section and which have been named electrogas dynamic generators. Such a generator is shown in ELECTROSTATICS AND ITS APPLICATIONS, A. D. Moore, Editor, John Wiley & Sons, New York, London, Sydney, Toronto, 1973, pp. 164–167. See also Simon, U.S. Pat. No. 2004352 granted June 11, 1935. While machines built in accordance with the disclosures of these publications are able to generate high voltages they are not practical for commercial generation of power.

SUMMARY OF THE INVENTION

The present invention provides apparatus for and a method of generating electric power from wind, a natural source of energy, which heretofore has not been utilized to a significant extent for commercial power generation. The apparatus of the invention is simple in construction and, in the preferred embodiment, uses the earth as one of the plates of a condenser while the other plate is fence-like structure through which the wind can blow from any direction. Since the wind does not always blow at the right time and velocity to generate the amount of power needed, the invention contemplates means for storing the energy generated at times when the supply exceeds the demand and for utilizing the stored energy to supplement the power generated by the wind during times of demand greater than the amount of power supplied by the wind generator.

The invention from its apparatus and method aspects will be described in relation to a number of illustrative embodiments thereof in conjunction with the drawings in which:

FIG. 1 is a block diagram illustrating the invention as a system for generation of electric power by extracting the energy from wind, converting the power generated to usable forms for homes and industry and for converting power generated in excess of demand into stored energy that can then be taken out of storage for use in periods of demand for electric power greater than the amount then being generated by energy extraction from the wind.

FIG. 2 is an schematic representation of one embodiment apparatus according to the invention comprising condenser plates and a charged particle generating means.

DETAILED DESCRIPTION OF SPECIFIC EMBODIMENTS OF THE INVENTION

Figure 3:
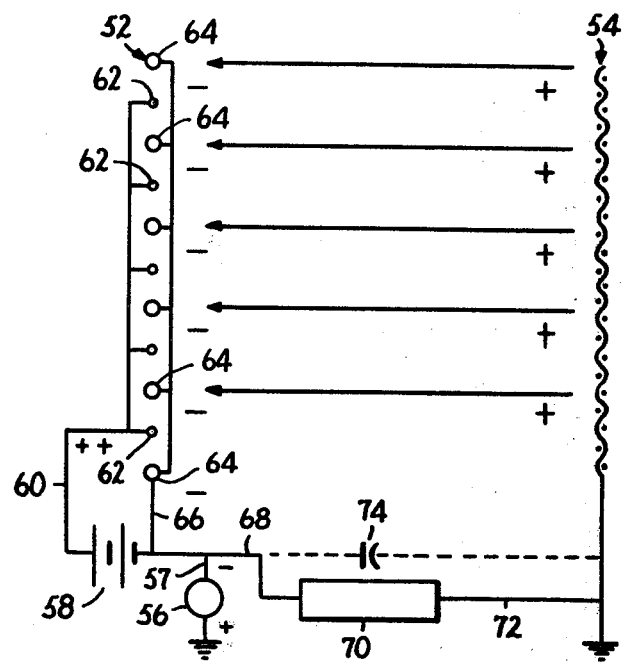
FIG. 3 is a schematic representation of a modification of the embodiment of FIG. 2.

The invention has both method and apparatus aspects.

Broadly speaking the method comprises producing in the open, i.e., in open and unobstructed or unconfined space, an electrostatic field through which wind can blow, forming or generating or supplying charged particles in or to the field to be entrained in and carried by the wind against the direction of the force imposed on them by the electrostatic field, which results in an increase in the potential across the field, collecting charged particles and utilizing the increased potential.

More particularly, the method of generating electricity from wind comprises ionizing molecules or particles in the air, moving said ionized molecules or particles by entrainment in the wind through a field having a voltage gradient biasing the ionized molecules or particles in a direction opposite to the direction of wind flow with a force less than the force imparted thereto by the wind, whereby the potential across the field is increased, and utilizing the increased potential to supply current to a load. The load may be (1) a distribution system in which the electricity is used for supplying light, heat, motive power, etc., or (2) a power storage facility such as storage batteries, water electrolysis equipment, or (3) any other means for storing electric power for reuse at a later time, or (4) means for directly utilizing and simultaneously storing the power generated. The method also comprises supplying a load by directly utilizing electric power generated by wind and by drawing electric power from the storage facility.

Broadly speaking the apparatus comprises means for producing an electrostatic field in the open through which wind can blow, means for generating charged particles to be entrained in and carried by the wind against the direction of the force imposed on said particles by the field, whereby the electric potential across the field is increased, means for collecting the charged particles, and means for making the increased potential available for utilization. This means for making the potential available for utilization may include leads to connect the generator to a power supply system supplying electricity for lights, heat, motors and the like, or means for storing the electric power for later use, e.g., at a time when the electric power generated by the wind is insufficient to supply the demand of a system and a supplemental supply of electric power to meet the demand is drawn from the stored power.

More particularly, the apparatus for generating electricity from wind energy comprises a capacitor plate having orifices through which wind can blow, means to generate charged particles adjacent to said plate, of proper polarity to be attracted thereto, a capacitor surface spaced from said plate, which may be a second capacitor plate or may be the earth itself, means to impress a voltage potential between the plate and surface to create an electrostatic field having a gradient such that a mild wind, e.g., a wind having a velocity of at least about five miles per hour, produces a greater force on the charged particles than the sum of the attractive force of the charge on the capacitor plate for the charged particles and the repulsive force of the charge on the capacitor surface, and means to transmit the voltage changes produced by the movement of the charged particles from the capacitor plate toward the capacitor surface to a load. The load may be, for example, a distribution system for electric power supplying energy for lights, heat, motors, and the like, or a storage system for electric power such as batteries, water electrolysis apparatus, and the like, or both a power distribution system and a power storage system.

A more detailed description of the method and apparatus of the invention will now be made in conjunction with the drawings.

Referring first to FIG. 1 which diagramatically illustrates a complete system for generating electric power from wind and utilizing it in an efficient manner, reference numeral 1 represents wind blowing in the direction of the arrow into a generator 2 connected by a conductor 3 to a bus 4. Connected to the bus is an inverter 5 which receives the high tension direct current from the generator and converts it to a kind of electricity which can be utilized for lights, motors, etc., in homes and industry. Most lights operate on 120 volts. Most motors in the United States of America, for example, are alternating current motors rated to operate at voltages approximating 120, 220 and 440 volts at a 60 cycle frequency. These motors may be single phase or muli phase, e.g., three phase, motors. Inverters for converting high tension direct current into alternating current of these voltages and phases are well known to the art and do not form part of the present invention except in combination with the other parts as described and claimed. The pwer coming from the inverter 5 is supplied by line 6 to a load, e.g., an electric power distribution system for homes and/or industry.

In as much as the wind does not always blow with just the required velocity to satisfy the demands on the system it is necessary for practical operation to provide means for storing the power generated in excess of demand against the time when the demand will exceed the amount of power the wind is capable of generating at that time. In the system illustrated in FIG. 1, bus 4 is also connected to electric cells 7 for electrolyzing water into its components hydrogen and oxygen. The hydrogen generated is conducted by a hydrogen line 8 while oxygen is led from the cells by means of an oxygen line 9.

The hydrogen line 8 is connected with the hydrogen storage facility 10 from which hydrogen can be withdrawn through lines 11 and 12. Line 11 may represent, for example, a hydrogen supply line to homes and industry much like the illuminating gas lines now used by utilities for supplying illuminating gas to homes, factories and the like. Line 12 is a hydrogen supply line leading to an engine generator 13 of any suitable type for utilizing the energy of the hydrogen to generate electric power which is conducted from the generator to a load by a power supply line 14. Power supply line 14 may be considered to be the same as power line 6 already described. Both of these lines 6 and 14 may be connected to each other or to the same load, e.g., an existing power distribution system and since power distribution systems generally used in the United States are 60 cycle, single or multi-phase lines at voltages from 120 to 440, the generator 13 may well be one which produces the alternating current of the required phase and voltage to connect directly into the closest available alternating current distribution system.

The oxygen line 9 is connected to an oxygen storage facility 15 which may be connected in turn to an oxygen utilization line 16. Line 16 may be connected to a machine for compressing the oxygen into gas cylinders for use in industry, hospitals, and the like or it may be used to burn the hydrogen flowing through line 12 into the engine generator 13.

Suitable automatic controls are preferable provided as illustrated at 17 with suitable connections 18 to the generator, 19 to the inverter and 20 to the electrolysis cells.

Electrolysis cells, hydrogen and oxygen storage facilities, engine generators for burning hydrogen to supply energy to a prime mover for driving an electric generator, electric generators and automatic controls for the pieces of equipment are all well known and readily available commercial items which do not, per se, constitute part of the present invention apart from the combination of the present invention as described herein and as defined in the claims.

The energy storage system illustrated in FIG. 1 comprising the equipment represented by reference numerals 7–16 is only one of a number of possible energy storing systems that may be used in conjunction with the wind generator of the invention. For example, instead of electrolyzing water the excess power generated at times when the demand is less than the supply may be stored in storage batteries or other means for storing electric power. The invention contemplates a system comprising the storage system in combination with means to generate electric power by utilizing wind to move charged particles through an electrostatic field against the electrostatic forces in said field, and means directly to utilize power generated. The means to store power generated becomes operative for storage during times of generation of power in excess of power utilization, and operative to give up or utilize stored power during times of power utilization in excess of power generation.

Referring now to FIG. 2, an embodiment of the invention is schematically illustrated which comprises a first condenser plate 22 and a second condenser plate 24. Means 26 is provided to charge plates 22 and 24 with charges of opposite polarity, e.g., a direct current voltage regulator having its negative terminal connected by line 28 to plate 22 and its positive terminal connected by line 30 to plate 24. Plate 24 has a number of + signs adjacent to it to show that it carries a positive charge distributed over the whole plate.

Plate 22 in this embodiment also serves as an ion source or generator. It comprises a plurality of corona generating means illustrated as needle points 32 connected to a common lead 34 and a plurality of plates illustrated as spheres 36 connected to a common lead 38. A suitable voltage is impressed on lines 34 and 38 by voltage regulator 26 by line 28 which is connected to common lead 38 for the spheres 36 and by line 40 connected to the common lead 34 for the needle points 32. It is known that when a sharp or needle point is inductively related to a sphere such as a hollow ball terminal an intense charge density obtains, and a consequent large potential gradient exists, just off the tip. This is true regardless of the respective polarities of the tip and sphere. A certain minimum potential must be obtained before any appreciable discharge will take place from a needle point. For very sharp points positively charged, discharges have been observed at about 2,500 volts. For similar points, negatively charged, the minimum potential is several hundred volts lower. The particular potential difference required to produce corona discharge depends on the geometry of the points and balls or wires and cylinders. Volt potentials across the wires of the order of about 10,000 volts produce satisfactory corona discharge. If the charge on the needle points or wires is positive, they will attract out of the immediate air some of the ever present free electrons which, under sufficient charge intensity, will attain a velocity great enough to knock electrons off neutral air molecules with which they collide, a process known as ionization. The fresh electrons so produced also rush toward the needle or wire in the same manner while the positively charged, heavy portions of the molecule are repelled away from the needles or wires 32 toward the oppositely charged spheres or cylinders 36. If the charge on the needles or wires 32 is negative, and the intensity sufficient, surface electrons will detach themselves and be driven off, together with negative particles of air and dust toward the adjacent spheres or cylinders 36.

In constructing apparatus in accordance with this embodiment of the invention, a fine metal wire is preferably used in place of a needle point 32 and a metal cylinder or tube is used in place of the plate 36. The wires and plates may be arranged alternately as shown, being held in this arrangement or relation by suitable insulating supports (not shown), or they may be concentrically arranged with the wire held at the axis of the tube by spaced insulating supports, somewhat in the manner later described in connection with FIGS. 6 and 7, in which case an air stream would have to flow through the tubes to bring charged particles into the electrostatic field.

Plate 22 which, except for the needles or wires 32 and the balls or the tubes 36 and their connections to common leads 34 and 38, is open so that air can move freely in either direction through it and may therefore accurately be described as a foraminous plate. Plate 24 is illustrated as a wire screen which may also be accurately described as foraminous. Such foraminous plates offer little resistance to the movement of air through them. In use the device of FIG. 2 would be placed in the open, i.e., in an unenclosed, unobstructed place so that the wind can blow freely through the plates and they would be so arranged with respect to the direction of wind flow that plate 22 is upstream from plate 24, i.e., the direction of the wind flow is from plate 22 toward plate 24. The voltage regulator 26 is so constructed and arranged that does two things:

(1) It impresses a sufficient potential across lines 34 and 38 to create a corona discharge in the vicinity of the corona disharge means 32 for the purposes described above, and (2) It impresses a sufficient potential difference on plates 22 and 24 to create an electrostatic gradient in the space between the plates to repel the charged molecules or particles created or generated by the corona discharge. The strength of this electrostatic gradient is kept low enough that the wind is strong enough, regardless of the velocity at which it may be blowing, to entrain and carry the charged particles against the force of attraction toward the near plate and the repulsive force from the far plate so that these forces are overcome and the particle is physically carried through this gradient. This requires the expenditure of the wind force through the distance across the field. This means that work (force times distance) has been done and the energy of the charged particle has been increased. This is made manifest in the equipment by an increase in potential between plate 22 and 24. The voltage regulator is so constructed and arranged as to utilize this increased potential to supply electricity through a line 42 to load.

The flow of electrons is opposite to the flow of charged particles. The flow of electrons is the electric current but, as known in the art, the direction of current flow is considered to be opposite to the direction of electron flow. This flow of electrons occurs because charged particles are collected on plate 24 after they have passed through the electrostatic field because it has what is called an image charge on it of opposite sign. Thus in FIG. 2, the image charge would be negative so that when the positively charged particle is collected, it takes up an electron to become neutral and the electron is supplied from plate 24, i.e., a flow of electrons takes place from wires 32 to plate 24 to supply the electrons needed at plate 24 to restore the positively charged (electron deprived) particles to neutrality.

It is immaterial to the effective operation of the device of the invention whether the plate 24 is positively or negatively charged, which of course means that the charge on the plate 22 may also be of either polarity so long as it is opposite to that of plate 24 in order to provide the necessary electrostatic gradient between the two plates. The potential difference between the corona discharge means 32 and the plates or cylinders 36 must be such that the charged particles generated thereby have the same polarity as the distant screen or plate 24 so that the force exerted on these particles is that of attraction to plate 22 and repulsion from plate 24.

In making the installation of the apparatus in the open it is advantageous to ground one or the other of the condenser plates. Such a connection 44 to ground 46 is shown in FIG. 2 from the line 28 but it will be understood that the ground connection may also be from plate 24 instead of plate 22, if desired, as more fully described in connection with FIG. 3.

In practice some means must be provided for holding the condenser plates 22 and 24 in generally upright condition which will ordinarily require some sort of base such as that shown at 48 for plate 22 and some sort of upright support for plate 24 (not shown in this embodiment). The base and support must be strong enough to hold the plates against the force of whatever wind may blow through them and the electrostatic field.

It will be understood from the foregoing description that when voltage regulator 26 imposes the potentials described above on plate 22, plate 24, common lead 34 and common lead 38, an electrostatic field is produced in the open through which wind can blow, that charged particles are supplied in that field, that the wind will entrain the charged particles in the field and carry them in a direction against the force imposed on them by the electrostatic field. The resulting increased potential is utilized, e.g., by supplying it to line 42 that may be connected to a load. The charged particles are supplied by ionizing the air adjacent to capacitor plate 22 and these particles have a polarity opposite the charge on the near plate and the same as the charge on the distant plate. This relationship of the polarity of the charged particles to the polarities of the plates results in forces attracting the particles to the near plate and repelling them from the far plate. Then when the wind entrains and carries these particles in a direction opposite to these electrostatic forces, the increase in potential between the plates results.

The embodiment of the invention illustrated in FIG. 3 has many features in common with that of FIG. 2. Thus two spaced, upright foraminouns capacitor plates 52 and 54 are provided which have essentially the same structure as capacitor plates 22 and 24 previously described. In FIG. 3, however, capacitor plate 54 is grounded rather than capacitor plate 22. The means provided in FIG. 3 for charging capacitor plates 52 and 54 with opposite charges is a source 56 of electric potential having its positive terminal grounded and its negative terminal connected by a line 57 in series with another source of electric potential 58 illustrated as a battery in series with source 56 and having its positive terminal connected by line 60 to each of a plurality of wires or needle points 62 which are at a higher positive potential or charge than condenser plate 64 as represented by + + signs adjacent to line 60. A plurality of tubes (spheres) 64 is arranged alternately with respect to the wires or needle points 62, each being connected to a common lead 66 which connects with line 57 between the two voltage sources, thus imposing a sufficient potential difference between the wires or points 62 and tubes or spheres 64 to create or generate positively charged particles which are attracted toward spheres 64 and repelled by plate 54. Line 57 is also connected to a line 68 leading to one terminal of a load 70 which is connected at its other terminal by line 72 to the second condenser plate 54 and ground. The system of FIG. 3 as thus described provides means for creating an electrostatic field between plates 52 and 54 through which wind may blow. This field exerts a force on positively charged particles generated by the ion generator comprising wires or needle points 62 and tubes or spheres 64 in the direction of the arrows shown in FIG. 3 and it is against this force that the wind carries the positively charged particles resulting in an increase in potential across the condenser plates 52 and 54. This system acts as a condenser or capacitor having an apparent capacitance which is represented in FIG. 3 by condenser 74 and the dotted lead lines connecting it with the two condenser plates 52 and 54.

The apparatus of FIG. 3 operates in essentially the same manner as already described for the embodiment of the apparatus illustrated in FIG. 2.

The vertical and substantially parallel arrangement of the spaced capacitor plates as illustrated in FIGS. 2 and 3 is not essential to the satisfactory operation of this type of device and the second condenser plate may be placed horizontally, i.e., its plane may lie at right angles to the plane of the first condenser plate. This relationship between the two condenser plates establishes an electrostatic field on both sides of the first condenser plate with the lines of the force curved but having very substantial horizontal components throughout the major distance of these lines of force from one condenser plate to the other.

Figure 4:
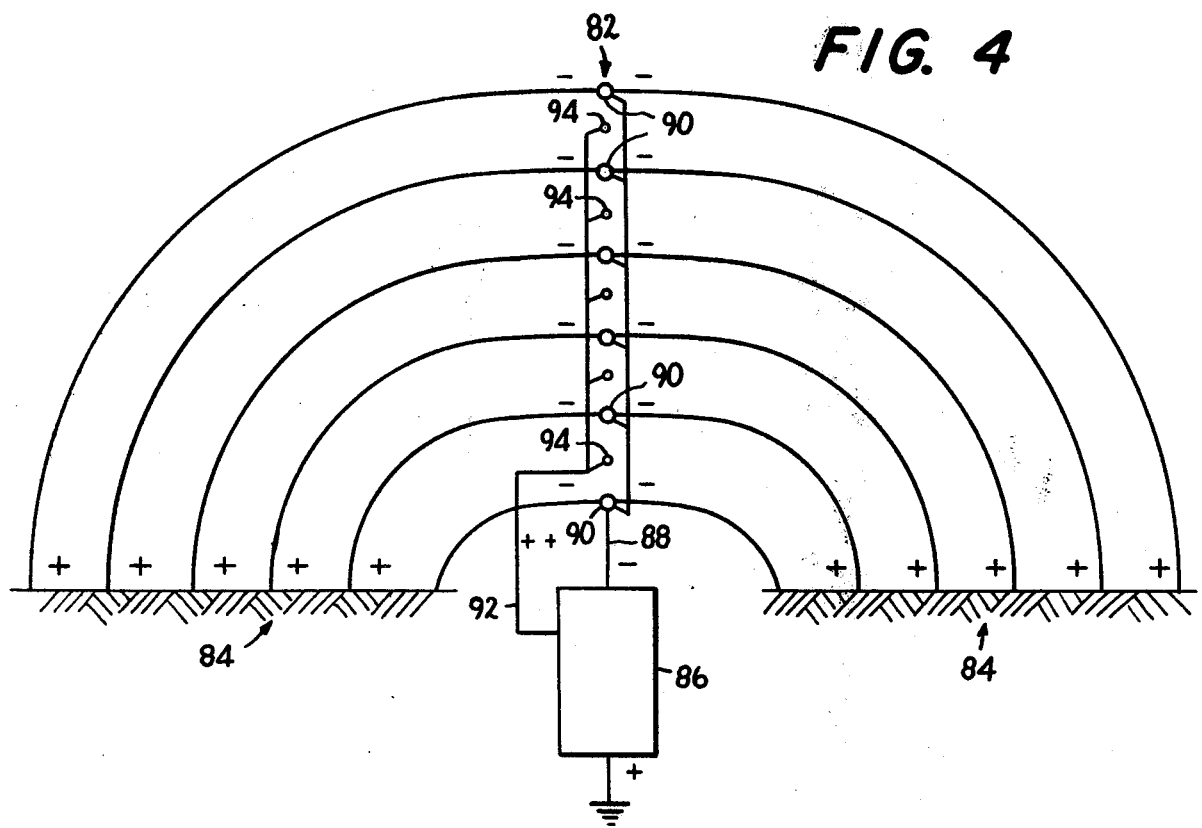
FIG. 4 is a schematic representation of another embodiment of the invention in which the earth is utilized as one of the condenser plates.

FIG. 4 illustrates an embodiment of the invention in which the first condenser or capacitor plate is vertical and the second capacitor or condenser plate or surface is the earth which extends for practically an infinite distance in all directions from the first capacitor plate.

In FIG. 4 the first capacitor plate 82 is illustrated as having essentially the same structure described for the first capacitor plates 22 and 52 in FIGS. 2 and 3. The second capacitor plate is practically horizontal, i.e., it is the earth 84. A voltage regulator (and load) represented by numeral 86 is grounded at its positive terminal and connected at its negative terminal by line 88 with a plurality of tubes or balls 90. This establishes an electrostatic field between plate 82 and ground 84 which has a contour generally of the shape illustrated by the curved lines in FIG. 4 which is not intended, however, to be a strictly accurate graphical representation of the lines of electrostatic force. They are sufficiently close to the actual lines of force to show clearly that there is a very substantial practically horizontal component to all of these lines of force in the vicinity of the first capacitor plate.

Voltage regulator 86 also has a terminal of higher positive potential than line 88 which is connected to a line 92 that makes connection with a plurality of wires or needle points 94 located between adjacent tubes 90.

Assuming that the wind is blowing in FIG. 4 from left to right, the same direction as assumed in the description of the operations of the embodiments illustrated in FIGS. 2 and 3, the molecules in the air are practically all neutral until they reach the corona discharge produced by the wires 94 at which time some of the molecules or air particles lose electrons to wires 94, leaving them positively charged and therefore attracted toward the condenser plate 82 and repelled away from the condenser surface 84 at the right side of the condenser plate 82. The wind then entrains and carries these positively charged particles against the force of the electrostatic field, raising the potential across the first condenser and second condenser surfaces and making it available for supplying current to the load 86.

Assuming that the wind is blowing from the right to left, air particles in the right electrostatic field would be practically uncharged until they pass through the corona discharge zone at or near the first condenser plate 82. These positively charged air particles become entrained with and carried by the wind as it moves them against the force of the electrostatic field, thereby raising the potential between the first condenser plate 82 and second condenser surface 84, respectively, and making this raised potential available for supplying electric power to the load 86. The apparatus of FIG. 4 is bidirectional because wind blowing from either direction is effective to produce the increase in potential described above. In view of the fact that the ground 84 is of practically unlimited extent all around the first capacitor plate 82, there will be an electrostatic field completely around it also, which makes the particular direction of the wind unimportant so long as it has any component at right angles to the plane of the first condenser plate 82.

The electron flow in the apparatus illustrated in FIGS. 3 and 4 is essentially the same as described above in connection with FIG. 2. Thus in the use of apparatus constructed in accordance with the principles illustrated in FIG. 3, charged particles will be collected on surface 54 by reason of its image charge where electrons will be supplied to neutralize them by flow from wires 62 where the electrons are given up and through ground to 54. Any charged particles that are not collected at plate 54 eventually fall to ground by reason of the image charge thereon where they will be neutralized by electrons supplied through ground from the wires 62. Where the second condenser plate or surface is the ground itself, as in FIG. 4, the charged particles all eventually reach earth by reason of the image charge thereon where electrons from wires 94 are supplied to neutralize them.

Figure 5:
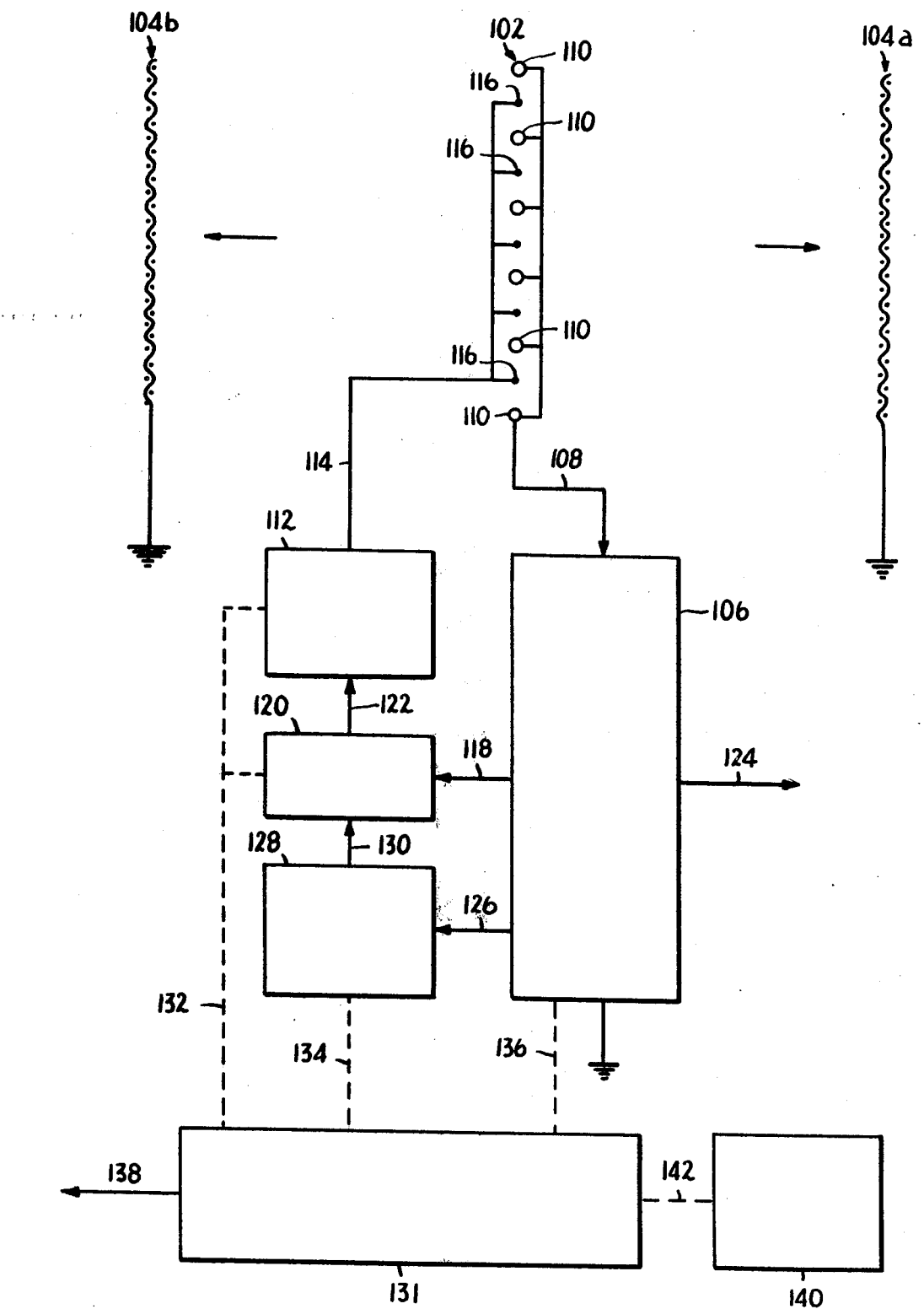
FIG. 5 is a schematic representation of another embodiment of the invention utilizing three condenser plates, one being located at an intermediate position between the other two, at which intermediate position charged particles are generated which can be moved toward either of the other condenser plates depending upon the direction of the wind.

Apparatus using upright condenser plates can also be made bidirectional by providing a second condenser plate on each side of the first condenser plate. This may viewed as dividing the second condenser plate into two parts, one on each side of the first condenser plate, or as providing two second condenser plates, one on each side of the intermediate first condenser plate. Such a structure is illustrated in FIG. 5 in which the first condenser plate 102 is mounted in upright position between a second condenser plate in two parts marked 104a and 104b with 104a spaced from plate 102 to the right and 104b spaced from the plate 102 to the left. Condenser plate 102 is insulated from earth or ground whereas condenser plates 104a and 104b are grounded. An electrostatic potential is imposed upon the first and second condenser plates by a high voltage power regulator and converter 106 which has one of its terminals grounded and the other connected to line 108 to which several cylinders or spheres 110 are also connected as illustrated.

An ion generator power regulator 112 has a terminal connected to a line 114 which is connected to a plurality of wires or needle points 116 located adjacent to tubes or spheres 110 to constitute therewith an ion generator. The other terminal of regulator 112 is connected with regulator 106 by line 118 leading from regulator 106 to a switch 120 and from the switch to the terminal of regulator 112 by line 122.

With this arrangement a field of proper strength between condenser plates 102 and the respective parts 104a and 104b of the second condenser plate can be established through the high voltage power regulator and converter 106 and at the same time the proper potential to create the corona discharge around wires or needle points 116 can be established between them and the tubes or spheres 110 by the ion generator power regulator 112. During normal operation switch 120 completes the circuit from 106 to 112 through leads 118 and 122.

The operation of the equipment of FIG. 5 as thus far described is essentially the same as the operation of the embodiment of the invention illustrated in FIG. 4. Thus wind blowing from left to right, as indicated by the arrow in the right electrostatic field of FIG. 5 becomes ionized in passing through the ion generator comprising parts 106–122 so that the charged particles which are carried by the wind to the right cause an increase in potential across plates 102 and 104a. Similarly if wind is blowing from the right toward the left as indicated by the arrow in the left electrostatic, the wind picks up charged particles in the vicinity of plate 102 and carries them against the force exerted on these charged particles by the electrostatic field and results in an increase in potential between plates 102 and 104a.

The increased potential on either side is available to cause electricity to flow to a load, as through line 124, from the high voltage power regulator and converter, at suitable voltage and frequency to satisfy the demands for the load, as previously described for lines 16 and 42 of FIGS. 1 and 2. In the event the power generated exceeds the demand of the load, switch 120 can close the connection 126 from the high voltage power regulator and converter to a battery or power supply 128 which is connected to the switch through a line 130. This enables the power generated in excess of the demands of the load to be stored in the battery for use at a time when the load requirements exceed the amount of power then being generated. It will be understood that the battery may be replaced by any other energy storage system in accordance with the principles previously described.

During the starting phase of operations before energy is generated by the system, ionization energy may be supplied by battery or power supply 128 to ion generator power regulator 112 by switch 120 which connects 128 to it by lines 130 and 122. After power is being generated by the system and is transferred to power regulator 106, switch 120 may connect 106 to 112 through lines 118 and 122 as above described.

The switching functions may be automatically controlled through an automatic controller 131 which has a line 132 connecting it to the switch and the ion generator, a line 134 connecting it to the battery or power supply 128 and a line 136 connecting it to the high voltage power regulator and converter 106. If desired, the automatic controller 131 may supply instruments in the engineering office with telemetry data by any suitable means, e.g., line 138. Sensors 140, e.g., to sense air speed and direction, stress and strain on the structure, subsystem operation and the like may also be provided and connected with the automatic controls 131 through a line 142.

Specific mechanisms suitable for use as parts 106–140 are well known to those skilled in the art and are not per se a part of the present invention apart from the combination in which these known elements are used. Further description of the structure of the elements identified is unnecessary and any man of ordinary skill in the art would be able to select from comercially available devices those which would be suitable for the equipment of the present invention.

Figure 6:
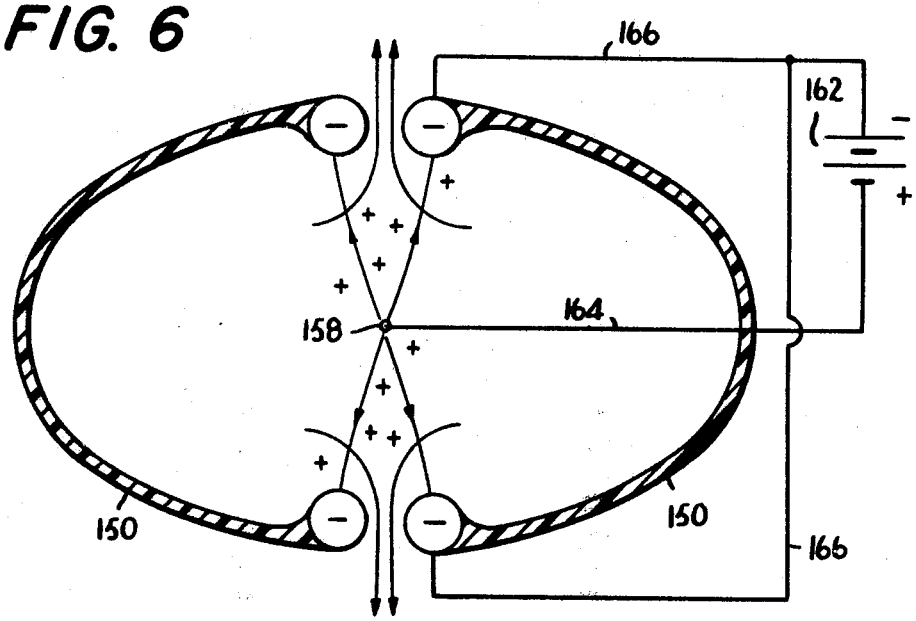
FIG. 6 is a cross sectional view of a streamlined charged particle or ion generator for use in the invention.
Figure 7:
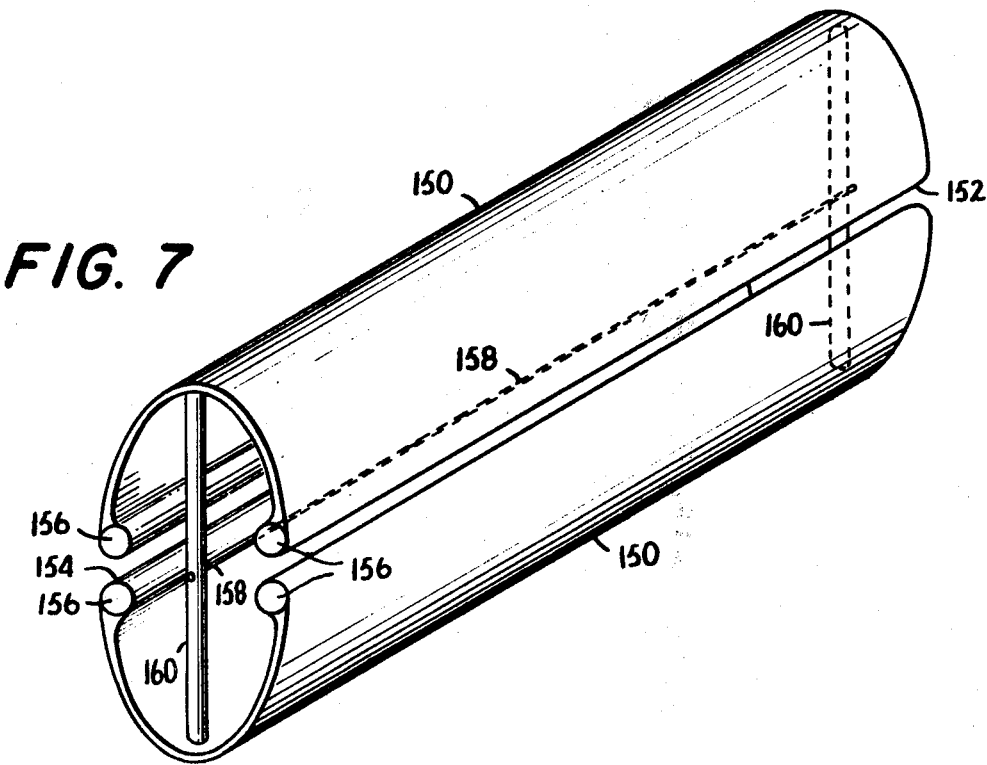
FIG. 7 is an isometric view of the ion generator of FIG. 6.

Instead of using a plurality of wires or needles and cylinders or balls as the ion generator as described above, a tubular type such as illustrated in FIGS. 6 and 7 may be used in any of the embodiments of the present invention. In the tubular embodiment of ion generator, a tube 150 made of nonconducting material, e.g., a suitable organic plastic, is used which is provided with a long slit 152 extending axially along the tube. While a single elongated slot is sufficient, it is preferable to provide two diametrically opposed slots 152 and 154 as illustrated in FIGS. 6 and 7. A metallic conductor 156 is secured to the tubular material at the edge of and entirely along the non-conducting material at each side of the slot. A satisfactory way of securing the metallic conductor 156 to the wall 152 is to mold the two together so that strong bond is formed which leaves the metal conductor exposed around approximately half of its perimeter.

Axially through the tube is located a fine wire 158 which may be mounted in support rods 160 which are secured at spaced locations to the respective halves of the tubular wall as shown in FIG. 7.

Means, e.g., a source of direct current such as a battery 162 to impress a voltage potential difference between conductors 156 and the axial taut fine wire by means of suitable connections 164 and 166, as seen in FIG. 6, cause a corona discharge around conductors 158 which forms a cloud of charged particles represented the + signs. In order to introduce these charged particles into the electrostatic field, a stream of air can be blown into one end of the tube, the other being closed so that the only exit for air blown into the tube is through the slot. The direction of flow of the air from the tube is illustrated by the arrows in FIG. 6. Preferably the slots are so located with respect to the direction of air flow that the exiting stream through slots 152 and 154 is approximately at right angles to the wind stream. Since the tubes offers resistance to air flow, it is preferred to contour the tube in cross section so as to present to the wind a surface which offers minimum resistance to the flow, viz, an airfoil contour which is roughly indicated by the somewhat eliptical shape of the tube in cross section as shown in FIG. 6. Any suitable means (not shown in the drawings) may be used to create the flow of gas through the tube for the purpose of sweeping the charged particles from the interior of the tubular ion generator through the slits 152 and 154 into the stream of air constituting the wind which entrains and carries these particles through the electrostatic field at one side or both sides of the tubular generator.

In order to generate sufficient electrical power in apparatus of the present invention to do substantial work, at least one foraminous upright capacitor surface of substantial area must be provided. For example, to generate sufficient electrical power to drive a 100 horse power motor at full load requires an area of foraminous capacitor plate somewhat more than one half the area of a football field, i.e., a capacitor plate about 300 feet long and 60 feet high. While such a structure can be readily erected in the manner of a fence, it is advantageous to construct it from modules which can be erected and taken down with a minimum of labor and loss of materials. One of the great advantages of the present invention is that when the apparatus comprises a first upright foraminous condenser plate made of modules and the earth is the second condenser plate, the equipment can be made readily portable from one site to another without excessive labor in the erection and demolition of the first condenser plate and associated apparatus. This would permit, for example, the setting up of a generator built in accordance with the invention in a remote area, e.g., a mine, or the like, where electric power is needed and then when the mine or other operation is depleted the apparatus can be taken down and moved readily to another remote location with minimum expense.

Figure 8:
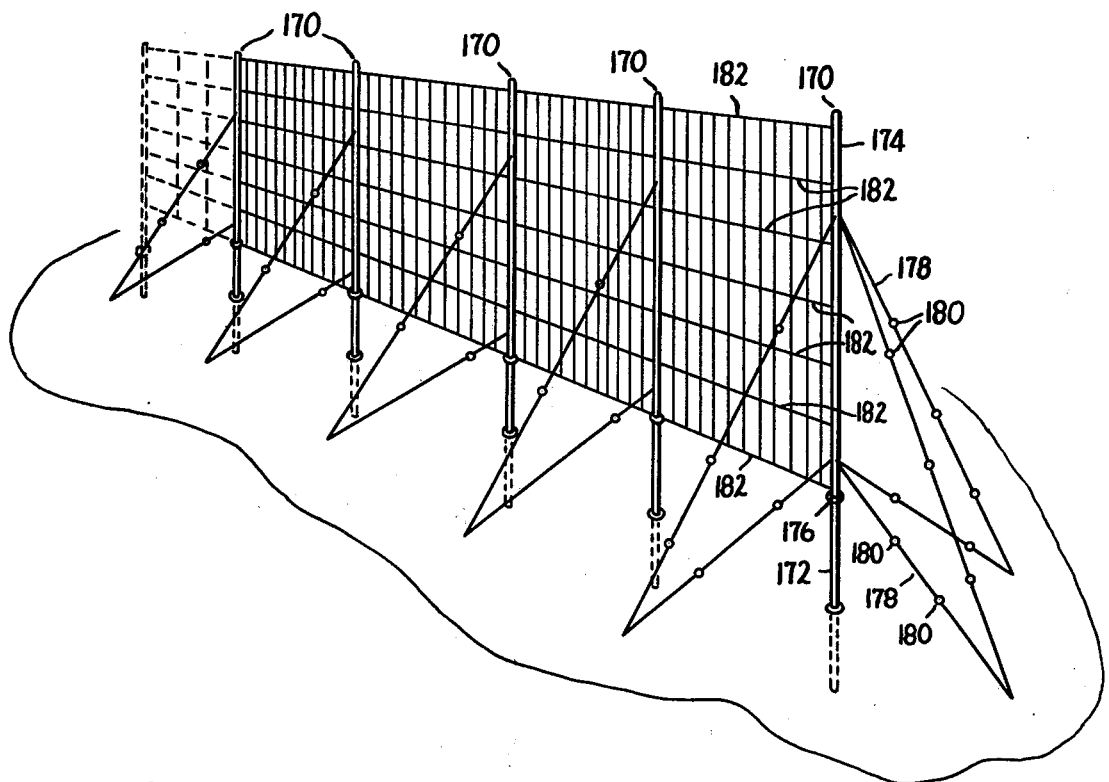
FIG. 8 is a diagramatic representation of a condenser plate adapted to be erected of modules on the surface of the earth.

FIG. 8 illustrates a modular structure for a first capacitor plate. The modular structure includes a plurality of poles 170 each of which comprises a lower section 172 adapted to be set into the earth far enough to hold the pipe in upright relation, an upper section 174, and a high tension insulator 176 connecting the two far enough above the ground that arcing or discharge from the capacitor to ground is avoided. In order to minimize the amount of material used in these poles 170 they may be strengthened by guy wires 178 having high tension insulators therein which are secured at one end to one or more points along the upper section of the pole and anchored at the other end in the earth. The end poles are preferably provided with three sets of such guy wires, one to resist bending stresses in the plane of the conductor plate and two other sets to resist bending at right angles to that plane, e.g., under wind induced stress, as shown on the near end pole of FIG. 8. The distant end of the capacitor surface has a section in dotted lines to show that the number of poles with intermediate wires and modules can be extended so as to provide a capacitor surface of any desired length and while no guy wires are shown for the dotted section it will be understood that it may have the same three guy wires on the end pole as the near end section. Similarly the height of the poles may be extended as desired. The upper sections of the poles 170 are connected together by taut, horizontal wires 182 spaced from each other a suitable distance. These horizontal wires provide hangers for modular frames illustrated more particularly in FIG. 9. Since it is advantageous to manufacture the modular frames of uniform size it is advantageous to space the wires 182 a uniform distance from each other.

Figure 9:
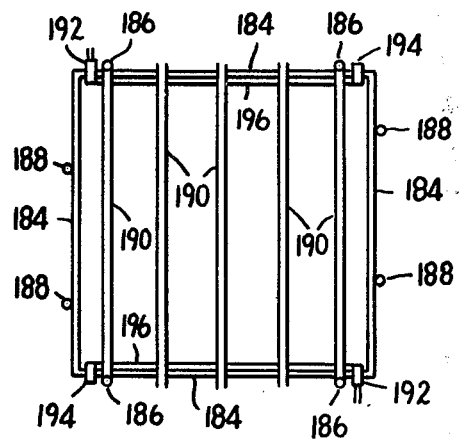
FIG. 9 is a schematic representation of a module suitable for use in the construction of a condenser plate as shown in FIG. 8.

Referring now to FIG. 9, the module comprises a peripheral metal frame 184 of suitable dimensions and strength. The height of the peripheral frame should correspond substantially to the distance between the horizontal wires 182. The length of the peripheral frame may be the same as or different from the height, depending upon design preference, but it should be of such length that a whole number of the modules will fit snuggly in the space between the two adjacent poles. Fastening means 186 may be provided on the upper and lower parts of the peripheral frame to secure the module to the horizontal wires above and below it so as to hold the module firmly within the framework of the capacitor plate. If desired, fastening means 188 may be provided on the vertical parts of the peripheral frame for securing adjacent frames to each other or, if desired, to secure them to vertical wires that may be secured to the horizontal wires 182 at regular intervals substantially equal to the length of the peripheral frames.

The specific structure of the fastening means 186 and 188 need not be illustrated as a man of ordinary skill in the art may select from known fastening means such fasteners as would be practicable for securing the modular condenser plates in the framework of poles and wires as described.

In the modular type of condenser plate construction a preferred form of ion generator is the tubular type illustrated in FIGS. 6 and 7 which lends itself readily to production in sections corresponding in length to the height of the peripheral frame 184 by providing mating connectors between adjacent ends of the tubes on adjacent modules of any suitable construction that can be readily assembled in such a way as not to leak substantial amounts of air through the joints when air is blown through the assembled tube, e.g., telescoping ends. FIG. 9 shows a plurality of such tubular sections 190 of ion generator secured in any suitable way, e.g., by rivets, or the like, (not shown) to the horizontal parts of the peripheral frame so that the tubular sections are vertical when the frame is hung on a wire 182. It is also necessary to provide for removable electrical connections of the thin wire 158 from one section to the next which may be readily accomplished by providing at the top and bottom of each frame a plug 192 at one side at the top and the other side at the bottom, a socket 194 at the other side and a connecting wire 196 insulated from the frame and connected electrically to the wire 158 in each section 190 of the ion generator.

All of the elements of the modular capacitor plate illustrated in FIG. 8 may be mass produced at relatively low cost and can readily be carried by ordinary trucks to any location accessible from a highway and they may also be readily carried by air, such as by helicopter, if the area in which the plate is to be erected is not accessible from a highway. In erecting the capacitor plates at the site where the electricity is to be generated, it is preferable to erect the poles in wells formed in the earth in which the bottom section of the pole snuggly fits but from which it can be readily removed when the condenser plate is to be dismantled and moved to another location. After the poles are all erected the guy wires are preferably secured in place so as to hold the poles in upright position. Next the horizontal wires 182 may be secured in place whereupon the modular sections constructed as shown in FIG. 9 may be put together, making the necessary air and electrical connections between the adjacent peripheral frames. After the capacitor plate has been completed the other equipment, including means for blowing air into the tubular ion generators, would be installed. The apparatus is then ready for immediate use.

Figure 10:
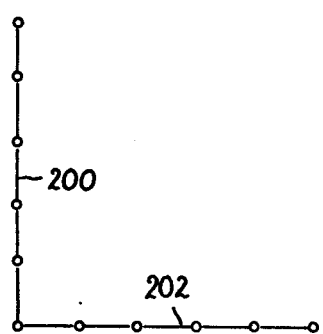
FIG. 10 is a schematic representation in top view of a condenser plate having two parts arranged at a substantial angle to each other so as to be independent of wind direction and which may be constructed of modules such as shown in FIGS. 8 and 9.

In most areas where wind blows regularly it tends to blow in one direction at one time of the day and in almost the opposite direction at another time of the day. In such areas if the vertical condenser plate is installed at right angles to the direction of regular wind flow, the maximum energy can be recovered from the wind in the form of electrical power. In some areas, however, where the wind blows with sufficient velocity to generate substantial electric power, the direction is not as uniform and in such areas the first condenser plate may be erected in more than one plane. Such a structure is illustrated in FIG. 10 where a part 200 of the condenser plate is at a substantial angle, e.g., a right angle, to the other part 202 of the plate. Such a condenser plate is able to extract substantial energy from the wind regardless of the direction in which it is blowing.

The apparatus of the present invention has numerous advantages and distinctions over the known electro-gas dynamic generators such as those referred to in the foregoing background of the invention. Among these advantages and distinctions are the following:

(1) The present invention is capable of operating with low air speeds characteristic of wind as opposed to the mechanically induced high speed tubular air flow of the prior art.

(2) The present invention does not require air tubes, wind tunnels, or any enclosure and preferrably is erected in the open with complete exposure of the generator to the atmosphere.

(3) Being unconfined by air tubes or wind tunnels, the charged particles generated adjacent to the upright capacitor plate are free to move in a direction at right angles to the direction of wind flow both upwardly and outwardly to present a cloud of charged particles in an area substantially larger than the area of the capacitor plate. This increases the effective area of the generator which is not possible in confined systems such as the prior art.

(4) The apparatus of the invention may be made bidirectional so that wind from any direction effectively gives up its energy in the manner described.

(5) The capacitor plate has a multiplicity of orifices and sources for charged particles as opposed to a single source and orifice in the prior art.

(6) The apparatus, in the embodiments utilizing the earth as one of the capacitor plates, does not require a "collector" plate.

(7) The apparatus of the present invention does not require "seeding" of the air with smoke, dust, aerosol vapor or the like to provide the initial charged particles since these charged particles are formed in the molecules of the air itself. Seeding, however, may be used with apparatus of the invention, if desired.

(8) The invention lends itself to modular construction which makes trasportation, erection and dismanteling comparatively easy and inexpensive.

(9) The only losses in the system of the invention are in the ion generator and the voltage regulator. While it takes some energy to create ions and some energy to regulate the voltages these losses are small compared to the energy extracted from the wind, thereby keeping the overall efficiency very high.

(10) In the apparatus and method of the present invention the air itself is the working fluid from which electrical energy is extracted. No special fluid is required as the carrier for the charged particles, thereby minimizing operating costs.

(11) In the apparatus and by the process of the invention the energy of the wind is converted into electrical energy without any moving parts whereas other methods of utilizing the energy of the wind such as windmills to drive conventional generators have many moving parts.

(12) The system of the present invention makes it possible to supply continuously and economically the necessary electrical power to operate the load even under conditions of low wind velocity during a part of the period of operation. This desirable result is achieved in the preferred embodiment because the storage system for conserving the energy during times of production in excess of demand and calling energy from storage during times of demand greater than production is an electrolysis unit and valuable byproduct oxygen is produced which reduces overall cost of operation. A system of the present invention compares very favorably in cost of electric production with hydroelectric installations.

While the present invention has been described and illustrated in conjunction with a number of specific embodiments, those skilled in the art will appreciate that variations and modifications may be made without departing from the principles of the invention as herein illustrated, described and claimed. Thus, means for generating charged particles such as spark and arc discharge, electron bean, ultra violet light, radio activity, secondary emission from bombardment of electrons, flame source, thermionic emission and the like, may be used instead of the points and balls or wires and cylinders.

Having thus described the invention what is claimed is:

1. Apparatus for generating electric power from the energy in wind and utilizing the electric power thus generated comprising means for creating an electrostatic field through which the wind blows, means for supplying charged particles for entrainment by said wind to convey them through said field against the electrostatic forces in said field to increase the potential across the field, and means for utilizing the increased potential, said means for supplying charged particles comprising a corona discharge device including an elongated tube-like structure of non-conducting material having an elongated slit, a metal bar along said slit, a fine wire extending axially of said tube-like structure, means to impress an electric potential between said bar and said wire to cause corona discharge, and means to cause air to flow into said tubular structure and out of said slit, said tube-like structure having two diametrically opposed slits.

2. Apparatus for generating electric power from the energy in wind and utilizing the electric power thus generated as set forth in claim 1 in which the means to cause air to flow into said tube-like structure supplies air under pressure to an end of said tube.

3. Apparatus for generating electric power from the energy in wind and utilizing the electric power thus generated as set forth in claim 2 in which said means for creating said electrostatic field comprises a generally planar first capacitor surface, said tube-like structure has an airfoil contour as viewed in cross section and the tube is secured adjacent to said first capacitor surface in such relation thereto that a plane through said wire and said slots is parallel to the first capacitor surface.

4. A modular condenser surface for an electric power generator comprising a plurality of poles comprising a lower section adapted to be secured in upright position in the earth and an upper section insulated from the lower section, guy wires having at least one insulator in each wire adapted to be secured at one end to the upper section of a pole and at the other end to be anchored to earth for holding the poles in upright position, a plurality of practically equally spaced wires adapted to be secured between adjacent poles in taut horizontal relation to each other, a plurality of modules each comprising a peripheral metal frame, means on each said frame for removably securing it to at least one of said wires, a plurality of sections of tubular ion generators secured to each frame, each section including a non-conducting slit tube, a metal strip along said slit and an axial fine wire, means for making air connections between sections of said tubular ion generators on one frame whose those on adjacent frames to provide a vertical tubular ion generator along practically the full distance between the upper and lower wires on said poles, and means for making electrical connections of metal strips and wires, respectively, between adjacent modules.

* * * * *